(12) United States Patent
Baudart

(10) Patent No.: US 7,673,903 B2
(45) Date of Patent: Mar. 9, 2010

(54) CONNECTING DEVICE BETWEEN THE STEERING COLUMN AND THE BODY OF A MOTOR VEHICLE

(75) Inventor: Laurent Baudart, Fresnoy en Thelle (FR)

(73) Assignee: Faurecia Interieur Industrie, Nanterre (FR)

( * ) Notice: Subject to any disclaimer, the term of this patent is extended or adjusted under 35 U.S.C. 154(b) by 378 days.

(21) Appl. No.: 11/666,285

(22) PCT Filed: Oct. 26, 2005

(86) PCT No.: PCT/FR2005/002687

§ 371 (c)(1),
(2), (4) Date: Apr. 26, 2007

(87) PCT Pub. No.: WO2006/045961

PCT Pub. Date: May 4, 2006

(65) Prior Publication Data

US 2008/0116677 A1 May 22, 2008

(30) Foreign Application Priority Data

Oct. 28, 2004 (FR) .................................. 04 11555

(51) Int. Cl.
*B62D 1/11* (2006.01)
(52) U.S. Cl. ..................................... 280/777

(58) Field of Classification Search ................. 280/777
See application file for complete search history.

(56) References Cited

U.S. PATENT DOCUMENTS

| 3,505,897 | A | * | 4/1970 | Van Camp et al. ............ 74/492 |
| 4,228,695 | A | * | 10/1980 | Trevisson et al. ............ 74/492 |
| 5,056,818 | A | * | 10/1991 | Sadakata ..................... 280/777 |
| 5,085,467 | A | * | 2/1992 | Converse .................... 280/777 |
| 5,209,135 | A | * | 5/1993 | Ichikawa ...................... 74/492 |
| 5,664,823 | A | * | 9/1997 | Misra et al. .................. 296/70 |
| 7,125,046 | B2 | * | 10/2006 | Sawada et al. .............. 280/777 |
| 7,311,333 | B2 | * | 12/2007 | Sato et al. ................... 280/777 |

FOREIGN PATENT DOCUMENTS

| DE | 10036397 | 2/2002 |
| JP | 2000-95115 | 4/2000 |

* cited by examiner

*Primary Examiner*—Paul N Dickson
*Assistant Examiner*—Nicole Verley
(74) *Attorney, Agent, or Firm*—Young & Thompson

(57) ABSTRACT

This connecting device between a steering column of a motor vehicle and a cross member fixedly joined to the vehicle body, the device being of the type comprising a steering column support fixedly joined to the column and secured to a rigid arm rigidly connected to the cross member, the connection between the arm and the column support being deformable under the effect of a front impact exerted on the cross member, is characterized in that the deformation is produced by the folding of a metal sheet of the support.

6 Claims, 2 Drawing Sheets

CONNECTING DEVICE BETWEEN THE STEERING COLUMN AND THE BODY OF A MOTOR VEHICLE

Figure 2:
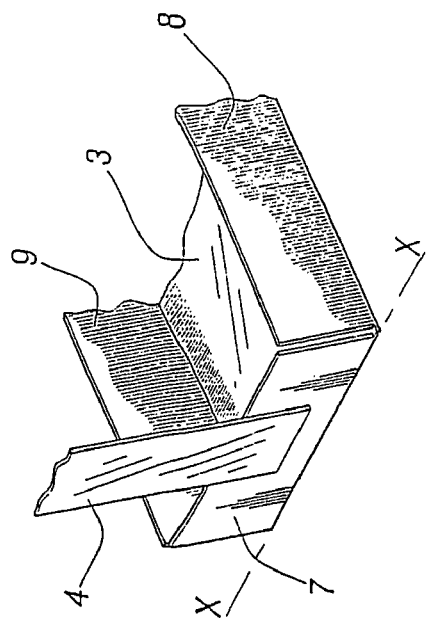

The present invention relates to a connecting device between a steering column of a motor vehicle and a cross member fixedly joined to the vehicle body, the device being of the type comprising a steering column support fixedly joined to the column and secured to a rigid arm rigidly connected to the cross member, the connection between the arm and the column support being deformable under the effect of a front impact exerted on the cross member, such as described, for example, in U.S. Pat. No. 4,943,028.

It is known that, for the safety and protection of persons installed in a motor vehicle, the passenger space thereof must, in the event of a collision, remain as rigid as possible while the front or rear exterior portions are deformed in order to absorb the kinetic energy.

A particular element of the passenger space is the steering column. The steering column involves particular constraints associated with its functions and with its positioning since a major portion thereof extends into the deformable front portion of the vehicle. Owing to the fact that the steering wheel is an element close to the driver's body, it is particularly important that it, and therefore the upper portion of the steering column, does not move backwards into the passenger space.

However, automobile manufacturers also seek to improve the comfort of their vehicles. An important element in this improvement is the reduction, and even suppression, of vibration.

With regard to the steering column, a well-known means of reducing this vibration is to secure it rigidly, by means of an intermediate member, to the Basic Lower Cross Member. This cross member, which contributes to the rigidity of the vehicle, is located between the engine region and the passenger space, at the front and parallel with the dashboard.

This cross member forms part of the deformation elements of the vehicle. It is therefore provided that this cross member can move back by 80 mm in the event of a front impact of 60 km/h.

The rigid connection between this cross member and the steering column propagates almost all of this displacement to the steering wheel. Therefore, by departing from the authorized deformation range, the steering wheel no longer conforms to safety standards.

The object of the invention is therefore to overcome this disadvantage by means of a device which has a particularly simple and economical structure and which ensures both comfort by reducing vibration and safety by a limited displacement of the steering wheel in the event of impact.

The invention therefore relates to a connecting device of the above-mentioned type, characterized in that the deformation is produced by the folding of a metal sheet of the said support.

Other features of the invention are:
the support comprises a metal sheet, an end portion of which is folded beforehand and secured to the arm;
the folding is effected about an axis which is substantially perpendicular to the direction of deformation;
the support also comprises, on each side of the said end portion, longitudinal flanges that are oriented substantially vertically;
the flanges are obtained by folding the metal sheet; and
the support also comprises, on each side of the said end portion, tongues that are folded about an oblique axis forming an angle greater than 30° relative to the folding axis of the end.

Figure 1:
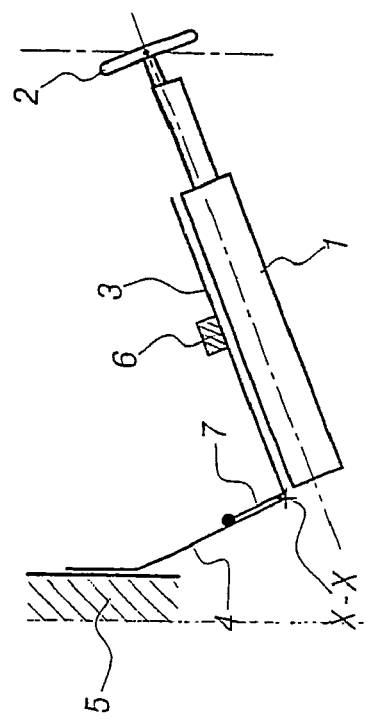
Figure 3A:
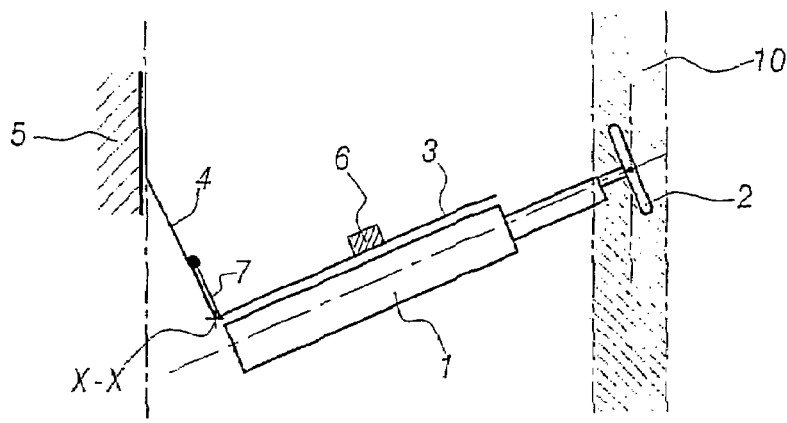
Figure 3B:
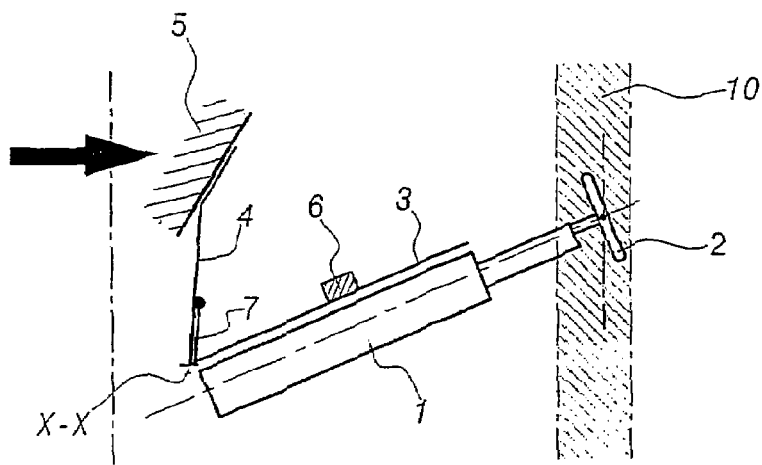
Figure 4:
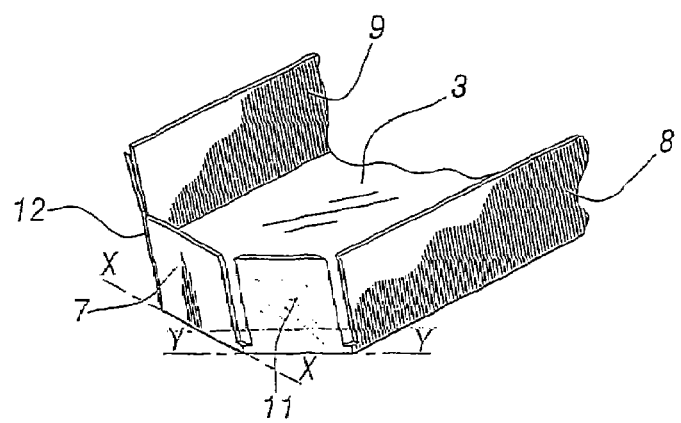

The invention will be better understood in the light of the following description which is given purely by way of example and with reference to the appended drawings in which:

FIG. 1 is a schematic side view of the device;
FIG. 2 is a perspective view of the front end of the device;
FIGS. 3A and 3B are schematic views of the device before and after a front impact;
FIG. 4 is a perspective view of a variant of the device.

In the following, the terms "front", "rear", "upper", "lower", etc. are considered in relation to a vehicle.

A steering column 1 is shown in FIG. 1. It comprises a steering wheel 2 at its rear end. This steering column 1 is fixedly joined to a support 3 which holds it in place. The support 3 is secured by means of a rigid arm 4 to a cross member 5 which is fixedly joined to the vehicle body.

The rigid arm 4 is secured by welding or bolting to the cross member 5 and to the support 3.

In a conventional manner, the support 3 is also secured to a rigid cross member 6 of the instrument panel.

The lower end of the rigid arm 4 is secured to an end portion 7 of the support 3, which end portion 7 is formed by folding upwards through 90° a metal sheet constituting the support 3, about an axis X-X which is substantially perpendicular to the axis of the steering column, FIG. 2.

The functioning of the device will now be explained in relation to FIGS. 3A and 3B.

FIG. 3A shows the device before deformation. The steering wheel 2 is thus located in a region 10 representing the maximum displacement limits permitted in the event of impact in order to comply with safety rules.

In the event of a front impact on the vehicle, FIG. 3B, the impact is passed on, in part, to the cross member 5 and therefore pushes the latter towards the rear. On the other hand, the cross member 6 is not substantially displaced towards the rear and therefore constitutes a bearing point for the support 3.

Since the metal sheet of the support 3 has been folded beforehand about the axis X-X, the bending resistance of the support is reduced along that folding axis.

Consequently, the end 7 of the support accompanies the arm 4 in closing the folding angle.

Therefore, the steering column 1 moves back only slightly into the passenger space, enabling the steering wheel 2 to remain inside the region 10 of the maximum displacement limits.

During normal operation of the vehicle, that is to say, apart from a collision, the steering support 3 and the arm 4 also have the function of reducing vibration on the steering column 1, in particular vertical vibration.

To that end, the support 3 must offer good rigidity. This rigidity is achieved, FIG. 2, by the creation of longitudinal flanges 8, 9 that are oriented substantially vertically. The flanges may be formed by folding the metal sheet of the support 3 or by providing members that are secured rigidly, preferably by welding.

In a variant of the device, FIG. 4, the support 3 comprises, on each side of the end 7 for the attachment of the arm, tongues 11, 12 folded about a respective oblique axis Y-Y forming an angle greater than 30° relative to the folding axis X-X of the end 6. The tongues 11, 12 contribute to the rigidity of the support 3 in addition to the flanges 8, 9.

In the drawings, the attachment end 7 as well as the flanges 8, 9 and the tongues 11, 12 have been shown folded upwards.

The person skilled in the art will appreciate that the device described also functions when folding is effected downwards.

The invention claimed is:

1. Connecting device between a steering column of a motor vehicle and a cross member fixedly joined to the vehicle body, the connecting device comprising a steering column support fixedly joined to the steering column and secured to a rigid arm rigidly connected to the cross member, the connection between the arm and the steering column support being deformable under the effect of a front impact exerted on the cross member, wherein the steering column support comprises a metal sheet, an end portion of which is folded beforehand and secured to the arm, wherein the folding is effected about an axis which is substantially perpendicular to the direction of deformation, wherein the support also comprises, on each side of the said end portion, tongues that are folded about an oblique axis forming an angle greater than 3° relative to the folding axis of the said end portion, said tongues extending substantially vertically, and wherein the deformation is produced by the folding of the metal sheet of the support.

2. Connecting device according to claim 1, characterized in that the support also comprises, on each side of the said end portion, longitudinal flanges that are oriented substantially vertically.

3. Connecting device according to claim 2, characterized in that the flanges are obtained by folding the metal sheet.

4. An assembly, comprising:
a connecting device mounted between a steering column of a motor vehicle and a cross member fixedly joined to the vehicle body,
the connecting device comprising i) a steering column support fixedly joined to the steering column secured by a connection to ii) a rigid arm rigidly connected to the cross member,
the connection between the arm and the steering column support being deformable under the effect of a front impact exerted on the cross member,
wherein the support comprises i) a metal sheet, ii) an end portion folded, at a folding axis, substantially 90° upright to the metal sheet, the end portion is overlapped with and secured to the arm, and iii) on each side of the said end portion, tongues folded substantially 90° upright about an oblique axis forming an angle greater than 30° relative to the folding axis, and
wherein the metal sheet of the support undergoes deformation under the effect of the front impact exerted on the cross member, the deformation being at least at the folding axis.

5. The assembly of claim 4, wherein the support also comprises, longitudinal metal flanges oriented substantially vertically.

6. The assembly of claim 5, wherein the flanges are connected to the metal sheet by a metal fold.

* * * * *